United States Patent [19]
Koo

[11] Patent Number: 5,463,433
[45] Date of Patent: Oct. 31, 1995

[54] IMAGE PROJECTOR

[75] Inventor: Hee S. Koo, Seoul, Rep. of Korea

[73] Assignee: Goldstar Co., Ltd., Seoul, Rep. of Korea

[21] Appl. No.: 301,497

[22] Filed: Sep. 7, 1994

[30] Foreign Application Priority Data

Sep. 16, 1993 [KR] Rep. of Korea ............ 1993-18698

[51] Int. Cl.⁶ .................................................. G03B 21/14
[52] U.S. Cl. ........................................ 353/84; 348/743
[58] Field of Search ........................ 353/84, 30, 31; 359/68, 580, 589, 590, 889; 348/743, 742, 771, 835

[56] References Cited

U.S. PATENT DOCUMENTS

| | | | |
|---|---|---|---|
| 4,399,455 | 8/1983 | Alvarez | 348/743 |
| 4,722,593 | 2/1988 | Shimazaki | 359/68 |
| 4,770,525 | 9/1988 | Umeda et al. | 353/84 |
| 5,371,543 | 12/1994 | Anderson | 348/743 |

FOREIGN PATENT DOCUMENTS 401238688   9/1989   Japan ........................ 353/84

Primary Examiner—Thomas B. Will
Assistant Examiner—William C. Dowling

[57] ABSTRACT

An image projector for obtaining a full color and cooling a lamp and the LCD, including a lamp for generating parallel light, an image displaying device for displaying a video signal, a rotating shaft rotatably disposed at the projector body, a steamboat paddle wheel-shaped color filter, disposed in such a way of receiving visual rays from the lamp onto its surface, for passing through light with a selected bandwidth having a predetermined wavelength such as Red, Green, Blue as well as simultaneously substantially cooling the image displaying device by fanning action; and a projection lens for forming an image displayed onto the image displaying device and onto a screen.

8 Claims, 6 Drawing Sheets

IMAGE PROJECTOR

BACKGROUND OF THE INVENTION

1. Field of the Invention

The present invention relates in general to an image projector, and more particularly to an apparatus capable of obtaining a full color by using one LCD as well as effectively cooling the LCD(Liquid Crystal Device).

2. Description of the Conventional Art

Conventionally, for developing a full color by using one projection type LCD, a variety of LCD projectors have been well known in the industry.

Among them, two types of LCD projectors equipped with either a pixel-by color filter or a circular rotating disk color filter will now be explained.

With reference to FIG. 1, a typical LCD projector using a pixel-by color filter, a lamp 1 which is disposed at the inside end portion of the body of a projector for generating parallel light is shown. An ultra violet/infrared ray cut filter 2 for passing only visual rays, while reflecting the ultra violet and infrared rays among the parallel rays which are advanced from the lamp 1, is disposed in front of the lamp 1. A LCD 3 for displaying images is disposed in front of a color filter 4 which is provided for developing a full color by selectively passing only the visual rays from the ultra violet/infrared ray cut filter 2 through a pixel-by color filter. A projection lens 6 for forming an image displayed on the LCD 3 onto a screen 5 is disposed in front of the LCD 3. Here, a lamp cooling fan motor 7 is disposed just behind the lamp 1 for cooling the heat generated due to the strong lighting of the lamp 1. A LCD cooling fan motor 8 is disposed just below the LCD 3 to cool the LCD 3 which is substantially weak to the heat.

However, the LCD projector using the pixel-by color filter, as described above, has disadvantages in that the resolution quality thereof is low because a pixel cell consists of three liquid crystal pixels.

With reference to FIG. 2, a LCD projector using a circular rotating disk color filter according to another embodiment of the conventional LCD projector for resolving the problems of the LCD projector using the pixel-by color filter is shown. Instead of the color filter 4 shown in FIG. 1, a circular rotating disk color filter 4' that is designed to selectively filter light with a bandwidth having a desired wavelength such as Red, Green and Blue is disposed behind the LCD 3.

With reference to FIG. 3, the circular rotating disk color filter 4 is divided into three equal pans at every 120°. Here, the projected image of LCD 3 is reflected onto the surface of the circular rotating disk color filter 4 and shown to occupy the red region.

In FIG. 3, the reference numerals are the same as to those of FIG. 1.

As shown in FIG. 3, the LCD projector using the circular disk rotating color filter 4' is designed to obtain one frame when one rotation thereof is executed, by selectively passing through light with a bandwidth of the visual rays having a predetermined wavelength and dividing the full color in a way of real time.

The image displayed by the circular disk rotating color filter 4' is formed onto a screen 5 through a projection lens 6.

With reference to FIGS. 4A and 4B, while the circular disk rotating color filter 4' rotates at a predetermined speed, a LCD projected image is in one of three parts of Red, Green and Blue is shown therein. Here, one region among Red, Green and Blue where is not completely intervened with another region should be ensured for a high efficiency of the color projection. The best projection efficiency angle defined as a1–a2 angle is 30° which is obtained from a formula 'a1–a2.' As a result, the conventional circular disk rotating color filter 4' rotates as having a projection efficiency of 30°.

In addition, the conventional circular disk rotating color filter 4' requires both a fan motor 4 for cooling the lamp 1 and a LCD cooling fan motor 8 for cooling the LCD 3.

The LCD projector using the conventional circular disk rotating color filter has an advantage of maintaining a resolution as much as the number of pixels while obtaining a color by using one pixel LCD 3 since each pixel can be a picture shell of the LCD 3. However, it requires some additional apparatuses: a lamp cooling fan motor 7 for cooling the lamp 1 and the LCD cooling fan motor 8 for cooling a LCD 3, making the volume thereof large, since the circular disk rotating color filter 4' should be made so that its radius is equal to or greater than the diagonal length of the LCD 3. In addition, when a horizontal and vertical length ratio of the LCD 3 needs to be 16:9 in case of a HDTV(High Definition Television), the size of the disk should be even larger since the size of the LCD 3 should fully fit onto one of the Red, Green and Blue regions.

SUMMARY OF THE INVENTION

Accordingly, it is an object of the present invention to provide an image projector capable of obtaining a full color by using one LCD as well as effectively cooling the LCD.

It is another object of the present invention to provide an image projector capable of simplifying the structure and thus reducing manufacturing costs.

It is still another object of the present invention to provide an image projector capable of enhancing light projection efficiency.

It is still another object of the present invention to provide an image projector that is smaller in size.

To achieve the objects according to the present invention, it includes a lamp for generating parallel light; an image displaying apparatus for displaying a video signal; a rotating shaft rotatably disposed at a projector body; a steamboat paddle wheel-shaped color filter, disposed to receive a visual ray from the lamp, for passing through light rays with a selected bandwidth having a predetermined wavelength such as Red, Green, Blue as well as substantially cooling the image displaying apparatus; and a projection lens for forming an image displayed onto the image displaying apparatus and onto a screen.

BRIEF DESCRIPTION OF THE DRAWINGS

The objects and features of the invention may be more readily understood with reference to the following detailed description of an embodiment of the invention, taken together with the accompanying drawings in which.

DESCRIPTION OF THE PREFERRED EMBODIMENTS

Figure 1:
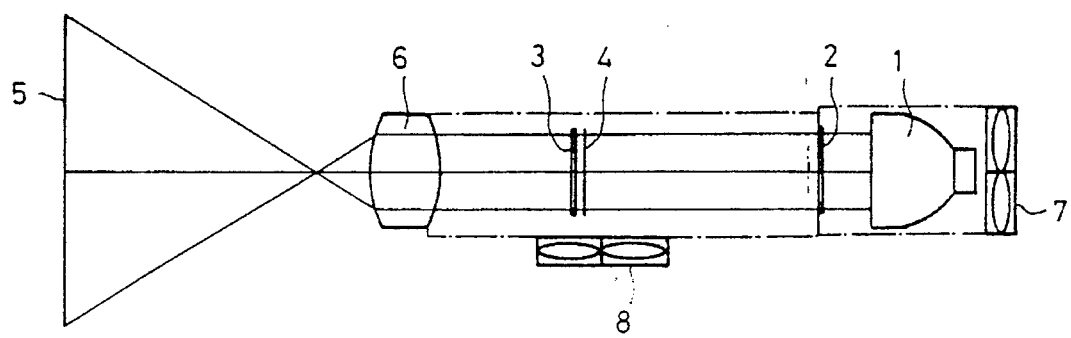
FIG. 1 is a structural view showing a LCD projector using a conventional pixel-by color filter.
Figure 2:
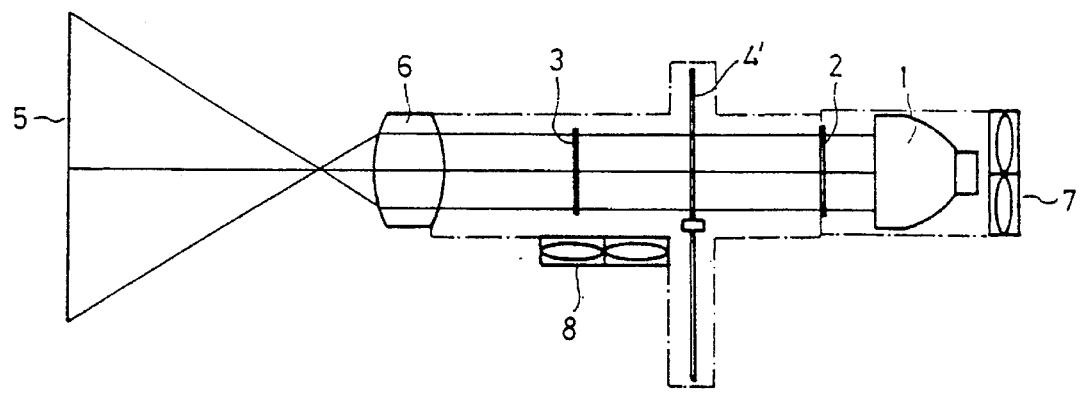
FIG. 2 is a structural view showing a LCD projector using a conventional circular disk color filter.
Figure 3:
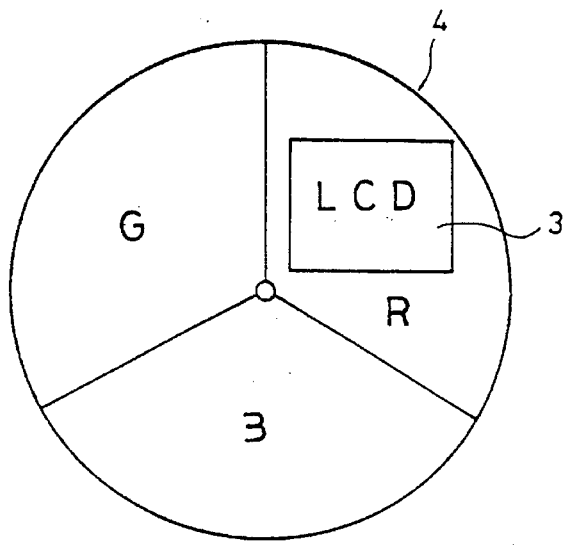
FIG. 3 is a front view of the conventional circular disk rotating color filter shown in FIG. 2.
Figure 4A:
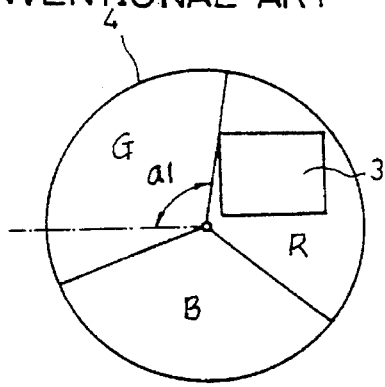
FIGS. 4A and 4B are operational views showing a projection efficiency of the conventional circular disk rotating color filter.
Figure 4B:
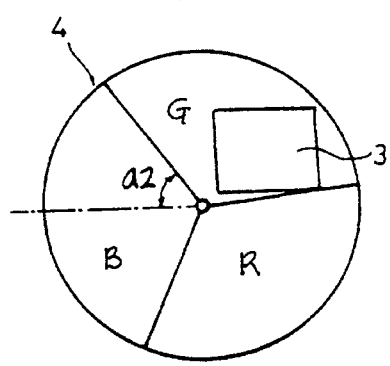
Figure 5:
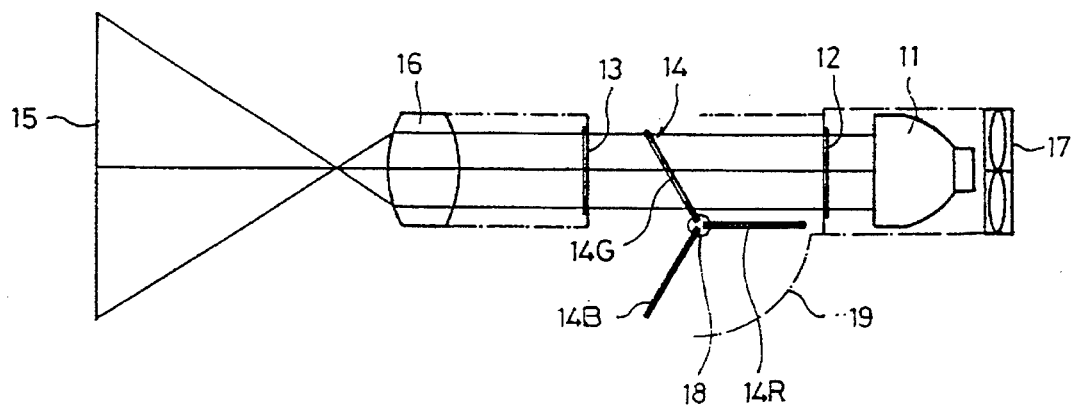
FIG. 5 is a structural view showing an image projector according to the present invention.

With reference to FIG. 5, an image projector according to the present invention is shown. The lamp cooling fan motor 17 for cooling a lamp 11 is disposed at the inside end portion of the image projector body. The lamp 11 for generating parallel light is disposed in front of the lamp cooling fan motor 17. An ultra violet/infrared my cut filter 12 is disposed in front of the lamp 11, for passing only visual rays, while reflecting the ultra violet and infrared rays among the parallel rays which is advanced from the lamp 11. A steamboat paddle wheel-shaped rotating color filter 14 disposed in front of the ultra violet/infrared my cut filter 12 includes a rotating shaft 18 and a rectangular-shaped Red, Green and Blue filter portions 14R, 14G and 14B. Here, the rotating shaft 18, both ends of which are rotatably affixed to both sides of the projector body(not shown), is disposed in front of the ultra violet/infrared my cut filter 12. A rectangular-shaped Red, Green and Blue filter portions 14R, 14G and 14B are disposed at a circumferential surface of the rotating shaft 18 with an angle of 120°, respectively. Here, each of the R, G, B filter portions 14R, 14G and 14B is disposed for substantially facing the parallel lights with its surface.

Here, the rotating shaft 18 is driven from a motor(not shown) at a predetermined speed. A casing 19 is disposed below the steamboat paddle wheel-shaped rotating color filter 14 in order to ensure the free rotation thereof. A LCD 13 for displaying a video signal is disposed in front of the steamboat paddle wheel-shaped rotating color filter 14. A projection lens 16 for forming an image displayed onto a screen 15 is disposed in front of the LCD 13.

The operation of the image projector according to the present invention will now be explained.

Figure 6A:
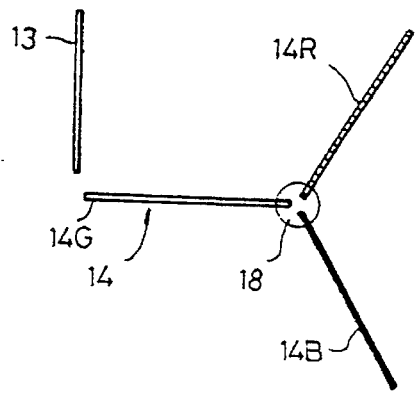
FIGS. 6A, 6B and 6C are side views showing an operational principle of the image projector according to the present invention.
Figure 6B:
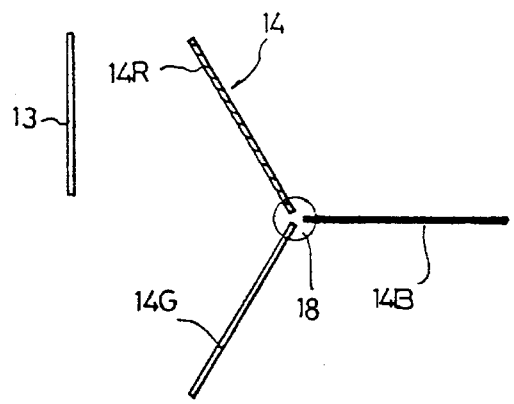
Figure 6C:
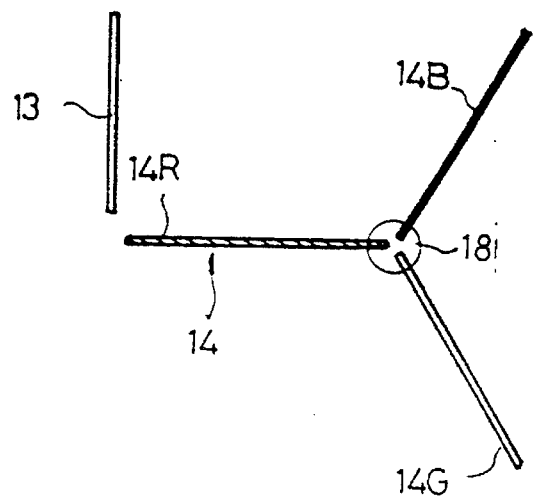
Figure 7:
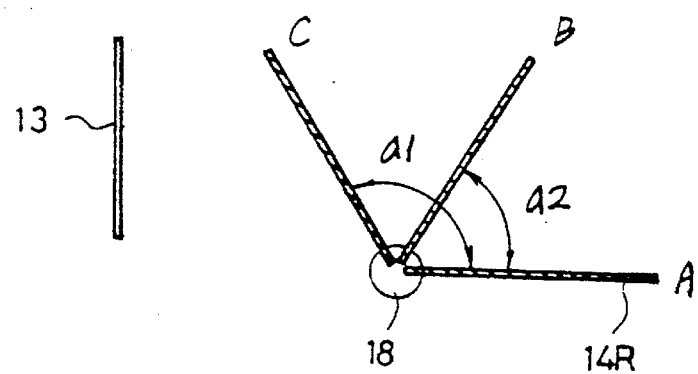
FIG. 7 is an operational view showing the projection efficiency of the image projector according to the present invention.
Figure 8:
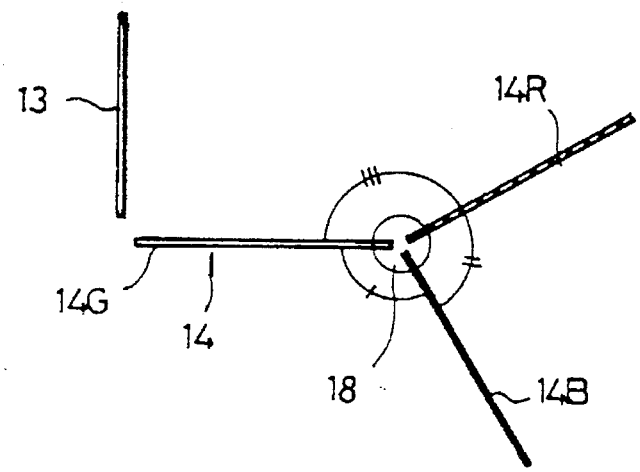
FIG. 8 is a side view showing another embodiment of the image projector according to the present invention.

With reference to FIG. 6, when electric power is applied, the lamp 11 generates white light which reflect parallely at a reflector(not shown) located inside the wall of the lamp 11. The reflected parallel light rays enter into the ultra violet/infrared ray cut filter 12 which is disposed for passing only visual rays while reflecting the ultra violet and infrared rays. Thereafter, the visual rays enter into the LCD which is disposed for displaying a video signal. Here, as shown in FIGS. 6A to 6C, while the steamboat paddle wheel-shaped rotating color filter 14, upon electric power supply, rotates at a predetermined speed equal to the number of the frames per second, the steamboat paddle wheel-shaped rotating color filter 14 only passes light with bandwidth having a predetermined wavelength in order thereby obtaining a full color from the LCD 13. Here, at least one full surface of the filter portions 14R, 14G, and 14B is substantially placed in a way of visual rays which enter into the LCD 13 based on the rotation speed thereof so that the surface of the filter portion 14R, 14G, and 14B receives the full size of the LCD 13 when viewing the LCD 13 from the location of the ultra violet/infrared ray cut filter 12. At this time, the steamboat paddle wheel-shaped rotating color filter 14 passes light with a bandwidth having the predetermined wavelength of Red, Green and Blue, simultaneously cools the LCD 13 which is weak to heat by the fanning action of the rotation. In addition, the heating lamp 11 is cooled by the lamp cooling fan motor 17.

Figure 9:
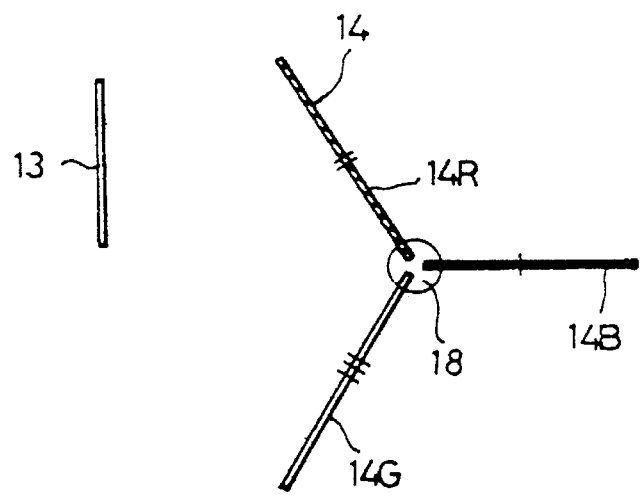
FIG. 9 is a side view showing still another embodiment of the image projector according to the present invention.

The steamboat paddle wheel-shaped rotating color filter 14 of another embodiment according to the present invention includes the R, G, B filter portions 14R, 14G, 14B which are fixedly disposed at the circumferencial surface of the rotating shaft 18 at angles different from each other. In addition, as shown FIG. 9, the length of each of the R, G, B filter portions 14R, 14G, 14B can be different from each other.

Figure 10:
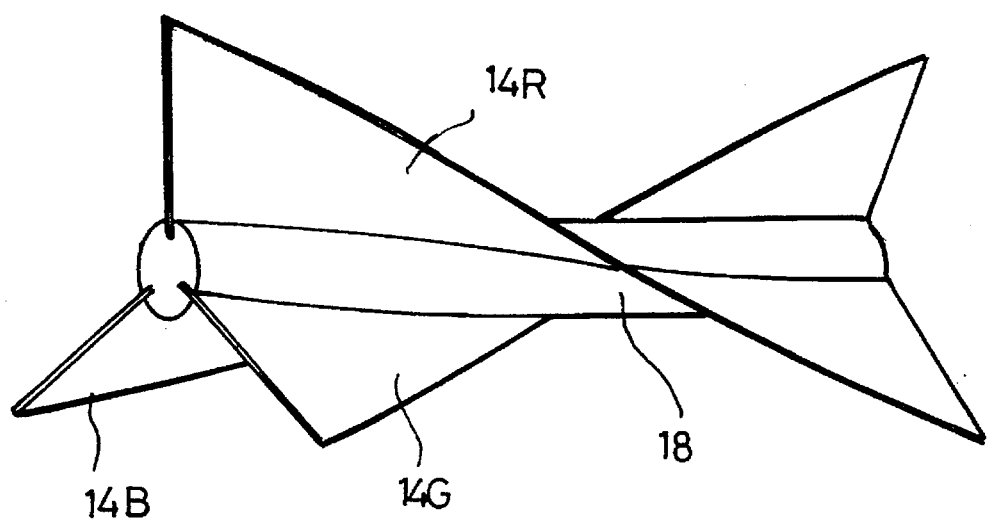
FIG. 10 is a perspective view showing still another embodiment of the image projector according to the present invention.

Meanwhile, with reference to FIG. 10, still another embodiment is shown. In the drawing, reference numeral 18 denotes a rotating shaft. As shown therein, each of surface of the R, G, B portions 14R, 14G, 14B which face the advancing visual rays is slightly twisted by a predetermined angle in a circumferential direction.

The effects of the image projector according to the present invention will now be explained.

The image projector according to the present invention can obtain a full color of a resolution equal to the number of pixel of the LCD by using the steamboat paddle wheel-shaped rotating color filter. In addition, a fan motor for cooling the LCD is not required since the image projector according to the present invention cools the LCD, thus noise caused by a LCD cooling fan motor for cooling the LCD can be eliminated. Accordingly, the structure can be more simplified and thus the manufacturing costs are reduced.

In addition, the projection efficiency angle, passing only one color among Red, Green and Blue, of the conventional image projector using the circular disk rotating color filter is 30° when evenly dividing 360° into 120°. However, the projection efficiency angle of the image projector according to the present invention is 60°, double of that of the convention image projector. For example, if a certain filter portion rotates from A location through C location, a range from A location through B location is intervened from each other but a range from B location through C location can receive a fully effective ray, as a result of the structure according to its characteristics, the projection efficiency angle is 60°.

In addition, since the shape of the R, G, B filter portions and the LCD are not the same but both rectangular, the size of the portions need to be only slightly larger than the LCD to ensure complete reception of the advancing light, thus the volume thereof can be reduced.

What is claimed is:

1. An image projector, comprising:

a lamp for generating parallel light;

image displaying means for displaying a video signal;

a rotating shaft rotatably disposed at a projector body;

a steamboat paddle wheel-shaped color filter, disposed to receive a visual ray from the lamp, for passing through light rays with a selected color bandwidth as well as substantially cooling the image displaying means; and a projection lens for projecting an image displayed onto the image displaying means, onto a screen.

2. The image projector of claim 1, wherein said steamboat paddle wheel-shaped color filter includes Red, Green and Blue filter portions, each of which being affixedly disposed at the circumferential surface of the rotating shaft at every 120°, respectively, in a lengthwise direction of the rotating shaft.

3. The image projector of claim 1, wherein said steamboat paddle wheel-shaped color filter includes Red, Green and Blue filter portions, each of which being fixedly disposed at the circumferential surface of the rotating shaft at angles different from each other, respectively, in a lengthwise direction of the rotating shaft.

4. The image projector of claim 1, wherein filter portions are affixed at the circumferential surface of the rotating shaft in a twisted lengthwise direction of the rotating shaft.

5. The image projector of claim 2, wherein said Red, Green and Blue filter portions have lengths thereof equal to each other.

6. The image projector of claim 2, wherein said Red, Green and Blue filter portions have lengths thereof different from each other.

7. The image projector of claim 3, wherein said Red, Green and Blue filter portions have lengths thereof equal to each other.

8. The image projector of claim 3, wherein said Red, Green and Blue filter portions have lengths thereof different from each other.

* * * * *